March 19, 1929.   P. G. EDWARDS ET AL   1,705,560
ELECTRICAL INSTRUMENT
Filed May 5, 1926   2 Sheets-Sheet 1

INVENTORS
P.G.Edwards and H.W.Herrington
BY
ATTORNEY

March 19, 1929.  P. G. EDWARDS ET AL  1,705,560
ELECTRICAL INSTRUMENT
Filed May 5, 1926   2 Sheets-Sheet 2

INVENTORS
P.G.Edwards and H.W.Herrington
BY
ATTORNEY

Patented Mar. 19, 1929.

UNITED STATES PATENT OFFICE.

1,705,560

PAUL G. EDWARDS, OF BROOKLYN, NEW YORK, AND HAROLD W. HERRINGTON, OF UPPER MONTCLAIR, NEW JERSEY, ASSIGNORS TO AMERICAN TELEPHONE AND TELEGRAPH COMPANY, A CORPORATION OF NEW YORK.

ELECTRICAL INSTRUMENT.

Application filed May 5, 1926. Serial No. 106,992.

This invention relates to electrical instruments, and particularly to instruments of the moving coil type capable of great sensitivity.

Instruments of the moving coil or d'Arsonval type comprise a coil of wire suspended by means of a fine wire between opposite poles of a magnet. Generally, the moving coil has its axis perpendicular to the lines of force of the magnetic field. Current is led into the coil by means of the suspension wire and leaves the coil by means of a flexible wire usually attached underneath the coil. In instruments of this type there are deflections of the moving coil proportional to the magnitude of the current flowing therethrough. In other words, when the current in the coil increases, the deflection increases, and vice versa.

In this invention there will be disclosed an electrical instrument of the moving coil type in which, in addition to the magnetic field established by the flow of current through a suspended moving coil, there is an electrostatic field also acting on the moving coil. In the particular type of instrument shown herein, for the purpose of illustration, the electromagnetic force co-operates with the electrostatic force and works in opposition to the force due to the suspension of the moving coil, but it is to be remembered that these three forces, or more generally, the equivalents of these forces, may be combined in any manner whatsoever within the scope of this invention.

It is an object of this invention to provide an electrical instrument which will give deflections proportional to the difference between the mechanical torque of a suspended movable coil and the electrostatic torque acting on the moving coil in response to the charged conditions existing between the moving coil and the poles of an electromagnet, or other suitable metallic shield.

It is another object of this invention to provide an electrical instrument for determining the characteristics of a source of voltage by balancing the electrostatic forces established by the source of voltage against the electromagnetic forces established by the flow of current from another source through a movable coil, the magnitude of the current flowing through the movable coil being varied until the movable coil is brought back to an arbitrary and predetermined deflection.

Figure 1:
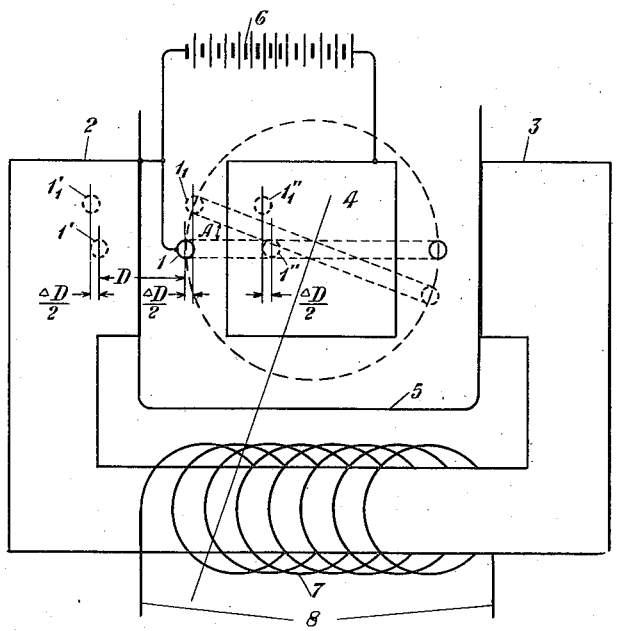
Figure 2:
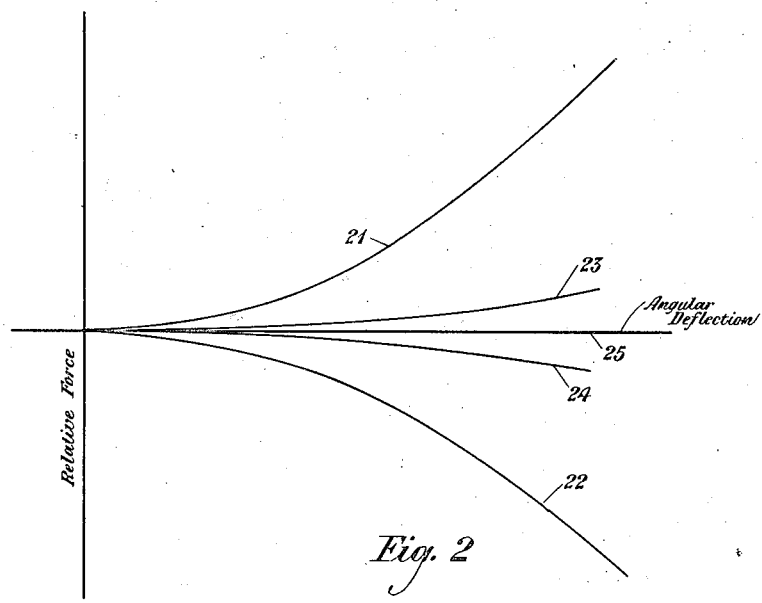
Figure 3:
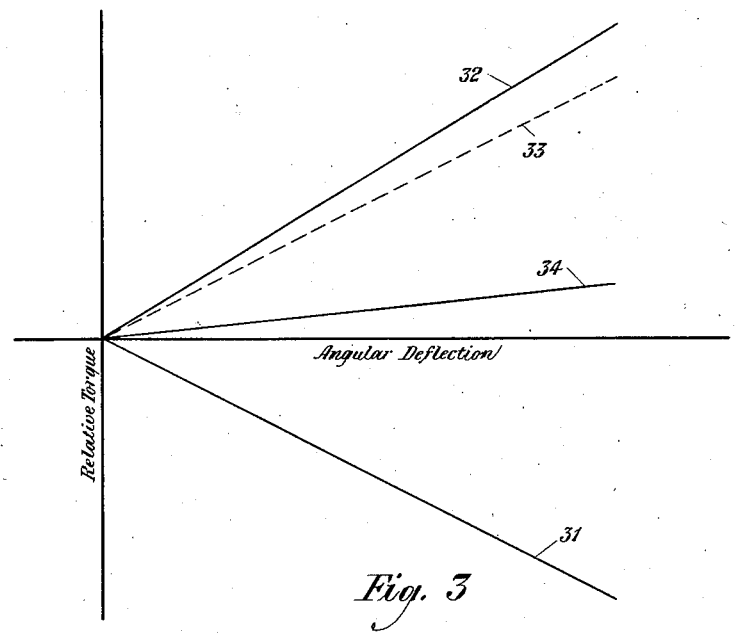
Figure 4:
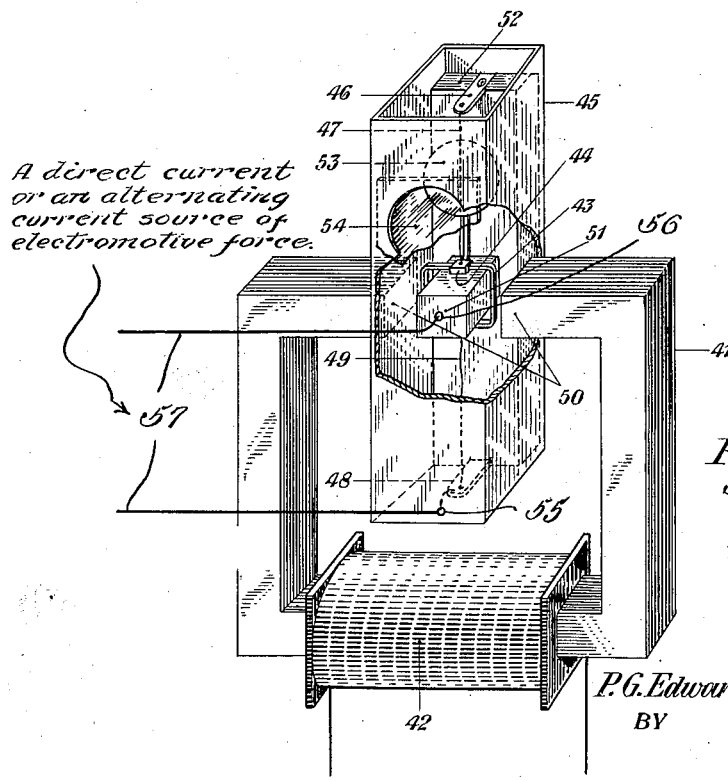

While the nature of the invention will be pointed out with particularity in the appended claims, the invention itself, both as to its further objects and features, will be better understood from the detailed description hereinafter following when read in connection with the accompanying drawing, in which Figure 1 represents a schematic diagram of the invention to illustrate the principles involved; Figs. 2 and 3 include a number of curves characteristic of the invention; and Fig. 4 represents a perspective of one instrument to which the principles of this invention have been applied.

Referring to Fig. 1, there is shown a loop 1 of a movable coil which may move about an axis perpendicular to the paper. This loop is mounted on the usual type of suspension between the pole pieces 2 and 3 of a core of iron. Within the loop 1 itself there is another core of iron 4 which decreases the magnetic gap between pole pieces 2 and 3. A shield 5, which may be of brass, copper or other conducting material, is fastened to the pole pieces 2 and 3 by means of a suitable cementing material which also insulates the shield 5 from the pole pieces 2 and 3, yet it will be understood that any other shield may be mounted in any manner whatsoever between the pole pieces 2 and 3 within the scope of this invention. The loop 1 is arranged so as to revolve between the pole pieces 2 and 3 and over and about the core of iron 4. A source of electromotive force 6 is provided, having one terminal connected to the shield 5 and the loop 1 and the other terminal connected to the core of iron 4. A coil of wire 7 is fixed on the core of iron having the pole pieces 2 and 3, and this coil of wire is energized by the flow of current from a source 8 connected to its terminals.

Inasmuch as there are like charges on the loop 1 and the shield 5 there will be a force of repulsion which will tend to move the loop 1 away from the shield 5, and inasmuch as there are unlike charges on the loop 1 and the core of iron 4 there will be a force of attraction tending to move the loop 1 toward the core of iron 4. Since these forces of attraction and repulsion have their lines of action coincident with the center of the coil, these forces will not exert any torque to produce rotation of the loop; but if the loop 1 were initially deflected to a position indicated by the reference character $l_1$ there would be a resultant torque due to these forces of attraction and repulsion which would tend to produce rotation of the loop, the torque being proportional to the sine of the angle of deflection A. However, it will be understood that by changing the shape of the metallic shield, the resultant torque may be made equal to any desired value.

In the drawing, $D$ represents twice the distance of the loop 1 to that part of the shield 5 adjacent to the pole piece 2. In other words $D$ represents the distance of the loop 1 to its virtual image 1'. When the loop 1 is deflected an angle A, it will be displaced from its former position a distance $\frac{AD}{2}$. At this angle of deflection the distance between the loop and its virtual image will be increased by $\Delta D$. By virtue of the displacement of the loop the force of repulsion between the loop and the shield 5 will be decreased. At this same angular displacement the distance between the loop and the surface of the core of iron 4 adjacent thereto will be decreased by $\frac{\Delta D}{2}$, and the distance of the loop from its virtual image will be decreased by $\Delta D$. Therefore, the force of attraction between the loop of wire and the pole piece 4 will be increased.

Furthermore, since only very small angles are involved herein, the net effect of revolving the loop through an angle A will be equivalent to the application of a force having a definite magnitude acting with an arm proportional to the sine of the angle of deflection, producing rotation about the axis of the loop. Since the sine of a very small angle is proportional to the angle itself, the electrostatic torque will also be proportional to the angle of deflection.

When a conductor in an electrical field tends to exert a force upon another, either of attraction or of repulsion, as found, for example, in an electrical condenser, the force is given by the well-known expression $$f = \frac{v^2}{2} \frac{dc}{dx} \quad (1)$$

In this expression, $v$ is the magnitude of the electromotive force between the conductors, $c$ is the capacity between the conductors and $dc$ represents the change in capacity when one of these conductors moves a distance $dx$ toward or away from the other conductor.

In reference to the arrangement disclosed in Fig. 1, the capacity is equivalent to that of a cylinder having a diameter equal to the diameter of the loop 1, to a plane, the plane being the shield 5 adjacent to the pole piece 2. Assuming a cylinder of infinite length and a plane of infinite extent, the capacity between the cylinder and the plane is the same as the capacity to neutral of the cylinder to its virtual image. This capacity is given by the well-known expression $$c = \frac{k}{2 \cosh^{-1} \frac{D}{d}} \quad (2)$$

In this expression, $k$ is the specific inductive capacity (the specific inductive capacity of air is $l$), $d$ is the diameter of the cylinder, or of loop 1, and $D$ is the distance between the centers of the cylinder and of its virtual image.

In order to simplify the mathematics which aid in understanding the principles of the invention, let $$y = c, \quad x = \frac{D}{d} \text{ and } \frac{k}{2} = k_1.$$

Then $$y = \frac{k_1}{\cosh^{-1} x} \quad (3)$$

or $$x = \cosh \frac{k_1}{y} \quad (4)$$

From the definitions of hyperbolic functions the following expression is obtained:

$$x = \frac{e^{k_1 y^{-1}} + e^{-k_1 y^{-1}}}{2} \quad (5)$$

Then the derivative of $x$ with respect to $y$ is shown by the following expression:

$$\frac{dx}{dy} = -\frac{k_1}{y^2} \left( \frac{e^{\frac{k_1}{y}} - e^{\frac{k_1}{y}}}{2} \right) \quad (6)$$

By inverting expression (6), and from the definition of the hyperbolic function of the sine, the following expression is obtained:

$$\frac{dy}{dx} = -\frac{y^2}{k_1} \frac{l}{\sinh \frac{k_1}{y}} \quad (7)$$

Substituting for $y$ its value obtained from the expression (3) given hereinabove, its follows that $$\frac{dy}{dx} = -\frac{k_1}{[(\cosh^{-1} x)^2][\sinh (\cosh^{-1} x)]} \quad (8)$$

Substituting for $x$, $y$ and $k_1$ their former values, then $$\frac{dc}{d\left(\frac{D}{d}\right)} = -\frac{k}{2\left(\cosh^{-1} \frac{D}{d}\right)^2 \left(\sinh \cosh^{-1} \frac{D}{d}\right)} \quad (9)$$

Expression (1) may now be written in the following form:

$$f = \frac{v^2 k}{4\left(\cosh^{-1} \frac{D}{d}\right)^2 \left(\sinh \cosh^{-1} \frac{D}{d}\right)} \quad (10)$$

The force given by expression (10) acts together with a similar force on the side of the loop adjacent to the pole piece 3 to form a couple having an arm proportional to the sine of the angle of deflection. Since for small angles the ratio $\frac{dc}{dD}$ is small, and since the forces of attraction and repulsion change by approximately equal increments, the force acting to produce rotation of the loop about its axis will be practically constant. Also, since the sine of the angle of deflection is proportional to the angle itself when the angle of deflection is small, as stated hereinabove, it follows that the electrostatic torque will be proportional to the angle of deflection.

These conclusions are arrived at graphically in Fig. 2, which shows a number of curves in which the relative forces, as determined from expression (10) given hereinabove, are plotted as ordinates against angular deflection as abscissæ. Curve 21 represents the increase in the force due to electrostatic attraction between the loop and the core of iron 4 placed between the pole pieces of the electromagnet, as the angle of deflection increases. Curve 22 represents the decrease in the force of electrostatic repulsion between the loop of wire and the shield 5 touching the pole piece adjacent thereto as the angle of deflection increases. For the particular case to which curves 21 and 22 apply, a curve 23 can be drawn proportional to the algebraic sum of the ordinates of curves 21 and 22. Curve 23 represents, therefore, the average of the electrostatic forces of attraction and repulsion and indicates, by its slightly rising characteristic, that the electrostatic force of attraction is greater than the electrostatic force of repulsion. It is to be particularly noted that upon the deflection of the loop or movable coil the resultant increase of forces acting directly on the movable coil, as shown by curve 23, may become completely neutralized by equal and opposite changes in electromagnetic forces produced by sending current through the movable coil. In other words, current may be sent through the movable coil and a rotation will be produced by the resultant electromagnetic torque, and this resultant electromagnetic torque may be made to vary at the same rate that the resultant curve 23 varies. Consequently, the changes in the electrostatic forces may be made equal and opposite and may be neutralized by the changes produced in the electromagnetic forces as the movable coil is rotated or deflected. It will be apparent that curve 24 may represent the rate of change of the electromagnetic force with deflection, as current is made to flow through the movable coil. Thus, curves 23 and 24 may neutralize each other so that there is no net change in the resultant of the combined changes in the electrostatic and the electromagnetic forces when considered together, in view of the changes produced in the deflection of the movable coil. The straight-line curve 25 represents the resultant neutralized condition of the changing forces with rotation. Consequently, in an instrument having the characteristics already described, the final deflection of the movable coil or loop of wire will be directly proportional to the current flowing therethrough.

It will be understood, however, that characteristics of the same general nature as those shown in Fig. 2 may be obtained for a movable coil known in the art as a flat coil. The force tending to produce rotation of a flat coil is given by the expression $$f = \frac{v^2 ka}{8x^2} \quad (11)$$

The capacity between the flat coil and the shield touching the adjacent pole piece is given by the expression $$c = \frac{ka}{4\pi x} \quad (12)$$

In expressions (11) and (12), $a$ is the area of the face of the flat coil exposed to the adjacent pole piece and $x$ is the distance between this face of the flat coil and the adjacent pole piece. In these expressions the capacity between the coil and the adjacent pole piece varies with changes in the distance $x$ to that pole piece, and the capacity does not vary by reason of its rotation.

It will be understood, also, that the expressions (1) to (10), given hereinabove, apply to coils of any cross-sectional shape whatsoever if the ratio $\frac{D}{d}$ is large. In such expressions the value of $d$ is obtained by dividing the perimeter of the cross-section by $\pi$.

Fig. 3 shows a number of curves which bear out the fact that the sensitivity may be varied by changing the electromotive force applied to the various elements. Assuming that there is a linear relationship between the electrostatic torque tending to produce rotation and the angular deflection, then the line 31 will represent this electrostatic torque. Then line 32 will represent the torque due to torsion of the suspension of the loop. Obviously, the electrostatic torque will tend to neutralize the torque due to the torsion of the suspension of the loop. The dotted line 33 represents the electrostatic torque shown by line 31 plotted in the upper part of the diagram, symmetrically arranged with respect to the horizontal axis. The line 34 will then represent the resultant of the electrostatic torque and the torque due to the torsion of the suspension.

It is conceivable that the electromotive force applied to the various elements may be adjusted so as to make lines 32 and 33 coincide. In that event the electrostatic torque will completely neutralize the torque due to the torsion of the suspension and therefore the line representing the resultant torque will coincide with the horizontal axis. Equal electrostatic and suspension torques are particularly desirable in instruments such as ballistic galvanometers, etc.

If it is desired to use the arrangements of this invention to measure the voltage characteristic of a source of current, the torsion of the suspension may be adjusted so as to give zero torque at some predetermined angle. When the source of current is applied, a current will then be sent into the movable coil sufficient to hold the movable coil at the predetermined angle. Current flowing through this movable coil will be proportional to the square of the voltage of the current applied. Consequently, this voltage can be determined from a calibration curve which shows the current in the movable coil plotted against the voltage applied. Inasmuch as the angle at which the coil is initially placed may be varied, and the electrostatic force may be similarly varied by some suitable potentiometer arrangement, such an instrument will have a very wide range.

Fig. 4 shows a perspective of an electrical measuring instrument employing the principles of this invention. A laminated core of soft iron or steel 41 has a coil of wire 42 fixed thereon. The magnetic field due to this coil of wire affords a stronger flux density than is obtained with a permanent magnet and consequently, as is well known in the art, this instrument is much more sensitive than an instrument of a permanent magnet type. A movable coil 43 having a terminal 44 is suspended in a metallic case 45 from a spring support 46 by means of a suspension wire 47 which may be, for example, of phosphor-bronze. Another spring support 48 is connected to the lower end of the movable coil 43 by means of another suspension wire 49 which may also be of phosphor-bronze. The metallic case 45 is permanently fixed in position between the pole pieces 50 of the electromagnet. Another core of iron 51, which may also be made of soft iron or steel, is fastened to an insulating support 52, the latter support holding all of the internal elements in position. A reflecting mirror 53 is carried by the suspension wire 47 so that the reflecting mirror may move when the movable coil 43 moves. A beam of light passes through a transparent glass window 54 and is reflected by the reflecting mirror 53 through the transparent glass window 54 to a graduated scale (not shown). The spring supports 46 and 48 may be considered the electrical terminals for the movable coil 43. Current enters the movable coil 43 by means of the suspension wire 47 and leaves the movable coil by means of the suspension wire 49. Means may be provided for twisting the suspension wire 47 an amount sufficient to place the movable coil 43 at any predetermined angle with respect to the pole pieces 50.

The spring support 48 is connected to a terminal 55 of the metallic case 45 by means of a wire conductor. Another terminal 56 is provided at the core 51. A source of voltage 57 is connected between terminals 55 and 56. It will be understood that source 57 is ordinarily a direct current voltage, although it may be a source of alternating current voltage when it is desired to measure alternating current characteristics.

While the invention has been disclosed in certain particular embodiments for the purpose of illustration, it is not to be limited by these embodiments, for it is capable of being set up in other and widely varied organizations without departing from the spirit of the invention and the scope of the appended claims.

What is claimed is:

1. In an electrical instrument having a moving coil suspended between the pole pieces of an electromagnet, the method of determining the magnitude of a voltage, which consists in establishing an electrostatic field around the moving coil resulting in an electrostatic torque tending to cause the rotation of the moving coil, and balancing that electrostatic torque by an electromagnetic torque due to the flow of current through the moving coil.

2. In an electrical instrument, the combination of an electromagnet, a moving coil suspended between the pole pieces of the electromagnet, a source of electromotive force, said source of electromotive force being connected between the moving coil and the electromagnet so as to establish an electrostatic torque tending to rotate the moving coil, and means for transmitting current through the moving coil to establish an electromagnetic torque on the moving coil tending to balance the rotation due to the electrostatic torque on the moving coil.

3. In an electrical instrument, the combination of an electromagnet, a moving coil suspended between the pole pieces of the electromagnet, the suspension of the moving coil producing a torque tending to rotate the moving coil, an electrostatic shield around the moving coil, a source of electromotive force, means for connecting the source of electromotive force between the electrostatic shield, the moving coil and the pole pieces of the electromagnet so as to effect an electrostatic torque which tends to rotate the moving coil, and means for transmitting current through the moving coil to effect an electromagnetic torque opposite in direction to that of the electrostatic torque.

4. In an electrical instrument having a coil moving between the pole pieces of an electromagnet, the method of determining the characteristics of any electrical source of current or voltage, which consists in suspending the moving coil so as to produce a torque tending to revolve the moving coil in one direction, electrically charging the moving coil with respect to the pole pieces of the electromagnet so as to produce a torque tending to revolve the moving coil in the opposite direction, and transmitting current through the moving coil to produce a torque tending to revolve the moving coil in the first mentioned direction.

5. In an electrical instrument, the combination of an electromagnet, a coil of wire arranged to rotate between the pole pieces of the electromagnet, means for suspending the moving coil so as to produce a torque tending to revolve the moving coil in one direction, means for electrically charging the moving coil with respect to the pole pieces of the electromagnet so as to produce a torque tending to revolve the moving coil in the opposite direction, and means for transmitting current through the moving coil to produce a torque tending to revolve the moving coil in the first mentioned direction.

6. In an electromagnet having a coil of wire arranged so as to revolve between the pole pieces of said electromagnet, the method of measuring the current and voltage characteristics of a source of electricity, which consists in suspending the coil of wire so as to obtain a torque by reason of its suspension, producing an electrical charge between the coil of wire and the electromagnet so as to obtain an electrostatic torque, and transmitting current through the coil so as to obtain an electromagnetic torque.

7. In combination, an electromagnet, a coil of wire, means for suspending the coil of wire between the pole pieces of the electromagnet, means for setting up an electric charge between the coil of wire and the magnet to obtain an electrostatic torque tending to revolve the coil of wire in one direction, and means for establishing an electromagnetic field by the flow of current through the coil of wire so as to obtain an electromagnetic torque tending to revolve the coil of wire in the opposite direction.

8. In an electrical instrument, the combination of two mutually reactive windings, a core of magnetic material having one of these windings fixed thereon, a bar of magnetic material placed between the pole pieces of the core of iron, the other winding surrounding the bar of magnetic material located between the pole pieces of the core of magnetic material and being free to move between these pole pieces, and a source of electromotive force having one terminal connected to the movable coil and the core of magnetic material and the other terminal connected to the bar of magnetic material.

9. In an electrical instrument having a coil suspended so as to be movable about its axis, the combination of means producing mechanical torque, means producing electromagnetic torque, and further means producing electrostatic torque, said mechanical, electromagnetic and electrostatic torques simultaneously acting on the coil to produce its rotation about its axis.

10. In an electrical instrument having a coil suspended so as to be movable about its axis, the combination of means producing electromagnetic torque, and independent means producing electrostatic torque, said electromagnetic and electrostatic torques acting simultaneously on the coil to produce its rotation about its axis.

11. In an electrical instrument, the combination of a movable coil through which current may flow to cause its rotation, and independent means for establishing an electrostatic field around said movable coil also causing its rotation.

12. An electrical instrument for measuring the characteristics of a source of current or voltage, comprising a moving coil, means for suspending the moving coil to effect a mechanical force tending to rotate the coil, means for transmitting current through the moving coil for establishing an electromagnetic field also tending to cause its rotation, and other and independent means for establishing a substantial electrostatic field around the moving coil to further cause its rotation.

13. In an electrical instrument having a suspended moving coil, the combination of a source of electromotive force, means whereby said source of electromotive force may set up an electrostatic field around the moving coil having a resultant force thereon acting to revolve it in one direction, and separate and independent means for establishing an electromagnetic field around the moving coil acting to revolve it in the opposite direction.

In testimony whereof, we have signed our names to this specification this 4th day of May, 1926.

PAUL G. EDWARDS.
HAROLD W. HERRINGTON.